United States Patent [19]

O'Neill et al.

[11] Patent Number: 4,851,953

[45] Date of Patent: Jul. 25, 1989

[54] LOW VOLTAGE CURRENT LIMIT LOOP

[75] Inventors: Dennis P. O'Neill, Mountain View; Carl T. Nelson, San Jose, both of Calif.

[73] Assignee: Linear Technology Corporation, Milpitas, Calif.

[21] Appl. No.: 114,219

[22] Filed: Oct. 28, 1987

[51] Int. Cl.⁴ .............................................. H02H 3/00

[52] U.S. Cl. ...................................... 361/101; 361/93; 361/91; 307/570; 307/249; 323/277; 323/278

[58] Field of Search .................. 361/87, 93, 100, 101, 361/91, 86, 88, 103; 307/570, 249, 248; 323/265, 234, 276, 277, 278

[56] References Cited

U.S. PATENT DOCUMENTS

| | | | |
|---|---|---|---|
| 3,796,943 | 3/1974 | Nelson et al. | 361/101 X |
| 3,843,933 | 10/1974 | Ahmed | 330/26 |
| 4,176,308 | 11/1979 | Dobkin et al. | 357/303 X |
| 4,564,879 | 1/1986 | Bienstman | 361/101 X |
| 4,638,396 | 1/1987 | Mukli et al. | 361/101 |
| 4,680,664 | 7/1987 | Leuthen | 361/101 X |

*Primary Examiner*—Derek S. Jennings

*Attorney, Agent, or Firm*—Mark D. Rowland

[57] ABSTRACT

A current limit circuit is provided which may be used to limit the current conducted by a pass transistor in a low dropout voltage regulator circuit having no ground terminal. The output current of the regulator is sensed by a low value resistor in the collector of the transistor. The voltage developed across the resistor is proportional to the output current of the regulator, and is used to vary a current ratio which sets the current limit value. The gain of the current limit loop is increased by providing positive feedback during current limiting. A foldback network is provided which reduces the current limit value at higher input/output voltage differentials. The feedback provided by the foldback network has a breakpoint which is sensitive to the operating temperature of the regulator circuit.

49 Claims, 2 Drawing Sheets

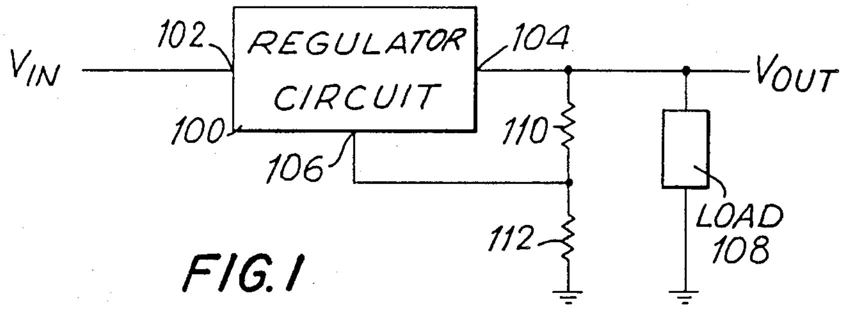
FIG. 1
FIG. 3
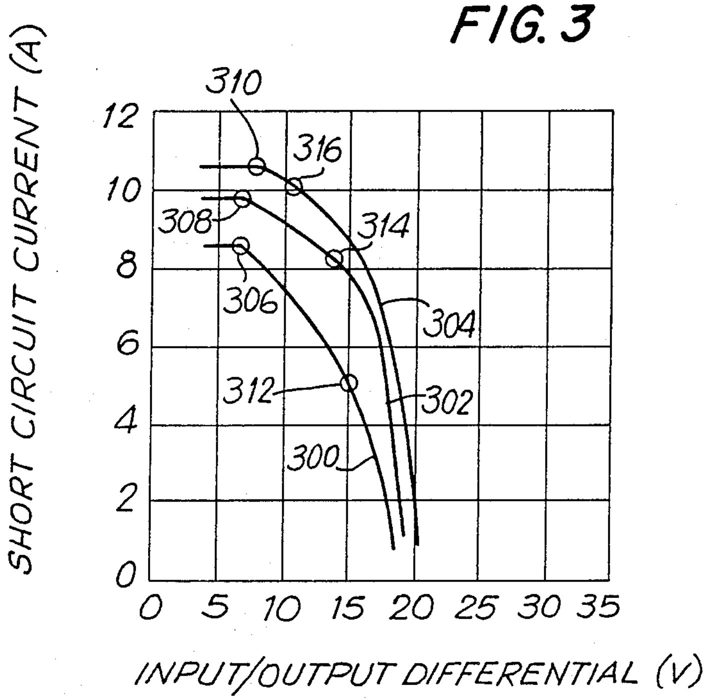

LOW VOLTAGE CURRENT LIMIT LOOP

BACKGROUND OF THE INVENTION

The present invention relates to a circuit which senses and limits the current conducted by a transistor to maintain the transistor in a safe operating area. More particularly, the invention relates to a circuit which senses the current conducted by the collector of a pass transistor in a voltage regulator circuit and limits the drive current provided to the base of the transistor when the sensed current exceeds a current limit value.

A series voltage regulator circuit requires a minimum voltage differential between the supply voltage and the regulated output voltage in order to function. This voltage differential is known as the dropout voltage of the regulator. For a given supply voltage, the dropout voltage of the regulator limits the maximum regulated voltage which can be supplied to the load. Conversely, for a given output voltage, the dropout voltage determines the minimum supply voltage required to maintain regulation. A voltage regulator having a low dropout voltage is therefore capable of providing a regulated output voltage at a lower supply voltage than can a voltage regulator voltage regulator having a higher dropout voltage. A low dropout voltage regulator can also operate with greater efficiency, since the input/output voltage differential of the regulator, when multiplied by the output current, equals the power dissipated by the regulator in transferring power to the load. For these and other reasons, a voltage regulator circuit having a low dropout voltage has many useful applications, and can improve the performance and reduce the cost of other circuits in which the regulator circuit is used. For example, the improvement in dropout voltage allows the use in power supplies of smaller heat sinks and smaller magnetic devices.

A series voltage regulator circuit controls the load voltage by controlling the voltage drop across a power transistor which is connected in series with the load. To prevent the power supply circuitry and regulator circuit from suffering permanent damage under accidental overload conditions, the regulator circuit typically includes circuitry to sense the current conducted by the transistor, and to limit that current to a predetermined safe maximum value when an overload occurs.

One of the failure mechanisms which can damage a transistor operating at a high power level is a phenomenon known as thermal runaway. Thermal runaway results from thermal instabilities in the transistor which cause localized areas in the transistor to overheat and burn-out at highpower levels. The phenomenon is a function of both the collector current and the collector-emitter voltage. Generally, the collector current necessary to trigger thermal runaway decreases at high voltages, although the exact threshold levels of current and voltage defining the safe operating area of the transistor depend on the design of the transistor, and are usually determined by an empirical process which takes the additional factor of temperature into consideration.

Thus, a current limit circuit used in a voltage regulator should ensure that the power transistor is operated within its safe operating area. Ideally, such a current limit circuit should have a high gain to provide a sharply defined current limit and to avoid a degradation in regulation as the current conducted by the transistor approaches the current limit value.

However, in a 3-terminal integrated circuit voltage regulator, providing such a current limit circuit presents several problems. In such a regulator, the current limit circuit (like other circuitry in the regulator) operates solely off the input/output voltage differential. This requirement is a particularly tight constraint in the case of a low dropout voltage regulator. Also, because the input/output voltage differential varies depending on load and line conditions, a current limit circuit should be capable of limiting current independently of the value of the input/output voltage differential although, as mentioned above, it should also be capable of decreasing the current limit value at increasing input/output voltage differentials to safeguard the power transistor.

In view of the foregoing, it would be desirable to be able to provide a current limiting circuit for a 3-terminal voltage regulator circuit having a low dropout voltage, which does not increase the dropout voltage of the regulator circuit.

It would further be desirable to be able to provide an improved high gain current limiting circuit for such a voltage regulator circuit.

It would also be desirable to be able to provide an improved current limiting circuit for such a voltage regulator circuit which is capable of varying the current limit value in response to changes in the input/output voltage differential.

SUMMARY OF THE INVENTION

It is therefore an object of the present invention to provide a novel current limiting circuit which is capable of operating solely off the input/output voltage differential.

It is a further object of the present invention to provide a novel current limiting circuit which is capable of limiting current substantially independently of the value of the input/output voltage differential.

It is also an object of the present invention to provide a novel circuit capable of limiting the output current of a low dropout voltage regulator that is capable of operating at an input/output voltage differential of less than one volt.

It is also an object of the present invention to provide a novel current limiting circuit having a high gain.

It is also an object of the present invention to provide a novel current limiting circuit which is capable of limiting the current conducted by a transistor to a value which varies as a function of the voltage across the collector-emitter circuit of the transistor.

These and other objects are accomplished by a current limit circuit in which current conducted by a pass transistor of a voltage regulator is sensed by a low value resistor in the collector of the transistor. The voltage developed across the resistor, which is proportional to the output current of the regulator, is used to vary the ratio of two currents conducted by a pair of transistors which are driven in common at a common base drive node. A low A.C. impedance base drive insulates the transistor pair from the effects of high frequency output voltage variations. The ratioed currents are provided to a pair of active loads, including a transistor that is normally held in saturation by the ratioed currents. When the output current reaches a predetermined current limit value, the ratioed currents cause the saturated transistor to come out of saturation. This, in turn, forward biases a transistor which shunts drive current away from the pass transistor of the regulator, thereby providing a high gain current limit loop. The gain of the loop is further improved by providing a small amount of positive feedback to the active load during current limiting. An additional temperature compensated feedback loop comprising a foldback network reduces the current limit value at high input/output voltage differentials by effectively changing the current ratio value at which current limiting occurs.

BRIEF DESCRIPTION OF THE DRAWINGS

The above and other objects and advantages of the present invention will be apparent upon consideration of the following detailed description, taken in conjunction with the accompanying drawings, in which like reference characters are provided to like characters throughout, and in which:

FIG. 1 is a schematic diagram of a circuit including a 3-terminal low dropout voltage regulator circuit of the type incorporating the current limit circuit of the present invention;

FIG. 3 is a graph showing the operation of the regulator circuit of FIGS. 1 and 2.

DETAILED DESCRIPTION OF THE INVENTION

Figure 2:
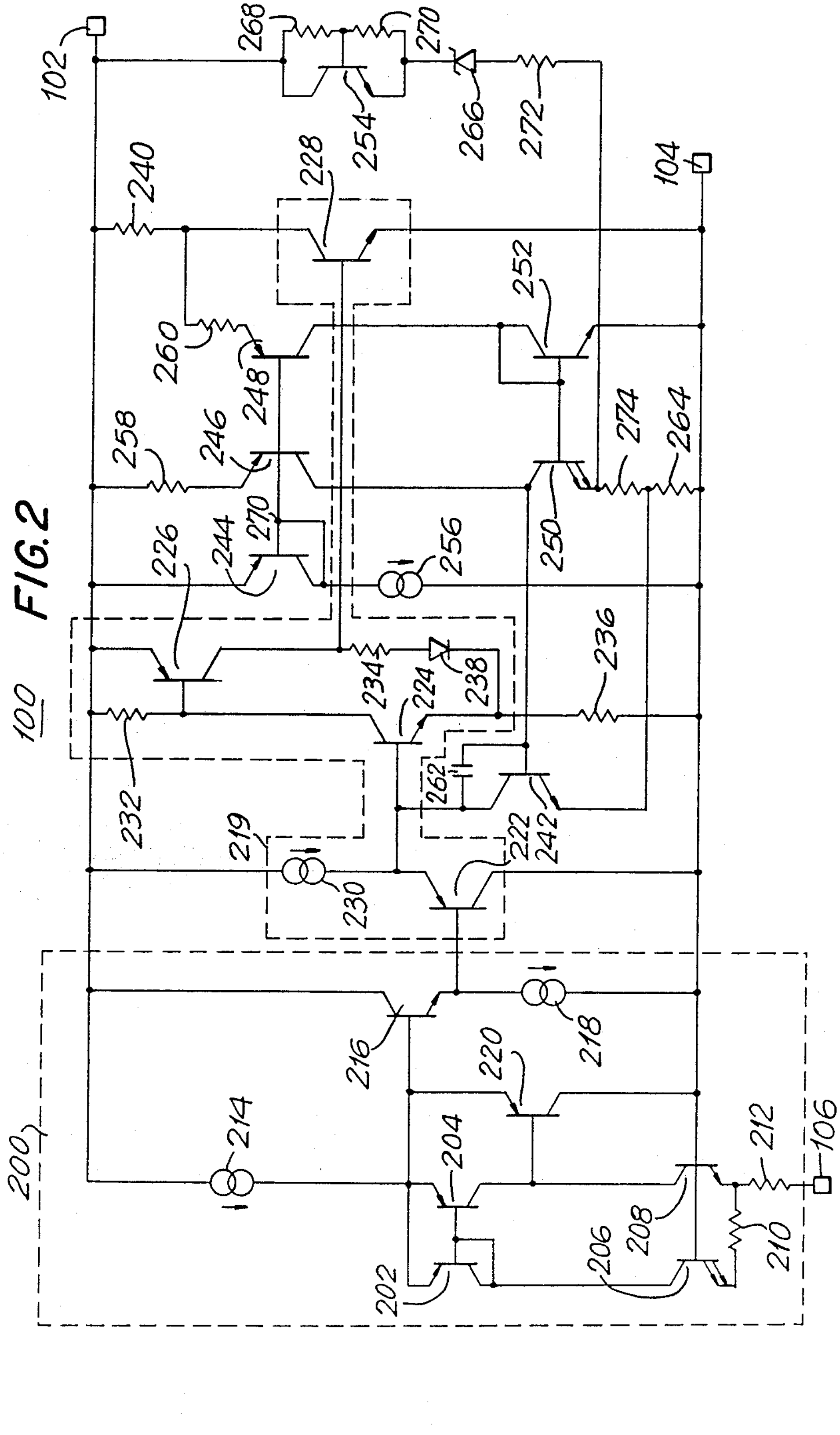
FIG. 2 is a schematic diagram of the regulator circuit of FIG. 1.

FIG. 1 shows an integrated circuit voltage regulator 100 incorporating the current limit circuit of the present invention. Regulator circuit 100 has three terminals for connection to external components: voltage input terminal 102, voltage output terminal 104 and voltage adjust terminal 106. When an input voltage is applied to voltage input terminal 102, regulator circuit 100 provides a regulated output voltage to load 108 connected to voltage output terminal 104. Regulator circuit 100 develops a reference voltage between output terminal 104 and adjust terminal 106, and regulates the output voltage $v_{out}$ to maintain the voltage across resistor 110 at the reference voltage.

Under normal load conditions, the voltage across load 108 is determined by the following formula:

$$V_{out} = V_{ref}(1 + R_l/R_2) + I_{adj}R_2$$

where $V_{ref}$ is the voltage between output terminal 104 and adjust terminal 106, $R_1$ and $R_2$ are the respective values of resistors 110 and 112, and $I_{adj}$ is the current conducted by adjust terminal 106. The current $I_{adj}$ conducted by adjust terminal 106 is small when compared to the current through resistor 110, and can therefore be ignored when calculating the output voltage.

A schematic of regulator circuit 100 of the present invention is shown in FIG. 2. Regulator circuit 100 is formed on a substrate which is connected to output terminal 104. Regulator circuit 100 includes control circuit 200 which maintains a reference voltage of approximately 1.2 volts between output terminal 104 and adjust terminal 106. The reference voltage is generated by a conventional Brokaw cell band-gap reference circuit including transistors 202, 204, 206 and 208, and resistors 210 and 212. Current source 214 provides current to the emitters of transistors 202 and 204. Transistors 202 and 204 form a conventional current mirror such that substantially equal currents are provided to the collectors of transistors 206 and 208. Transistor 206 has an emitter area which is n times larger than that of transistor 208, so that transistors 206 and 208 operate at different current densities. A typical value for n is 10, although other values of n can be used. The difference in emitter area between the emitters of transistors 206 and 208 results in a difference voltage across resistor 210. Neglecting base current, a current having a value substantially equal to the sum of the currents conducted by the collectors of transistors 206 and 208 is conducted by resistor 212.

The voltage $V_{ref}$ at the bases of transistors 206 and 208, with respect to the voltage at adjust terminal 106, is equal to the sum of the base-emitter voltage of transistor 208 and the voltage across resistor 212. The band-gap reference circuit operates such that the negative temperature coefficient of the base-emitter junction of transistor 208 opposes the positive temperature coefficient of the voltage across resistor 212. To a first approximation, the coefficients cancel one another when the voltage $V_{ref}$ at the base of transistors 206 and 208 is approximately 1.2 volts (the band-gap voltage of silicon), such that at that voltage level the change in voltage $V_{ref}$ with a change in temperature is nominally zero. The circuit thus produces a temperature-stabilized voltage $V_{ref}$ when the values of emitter ratio n and resistors 210 and 212 are chosen to provide a voltage $V_{ref}$ approximately equal to 1.2 volts. Typical values for resistors 210 and 212 are 2.4K ohms and 12K ohms, respectively.

Transistors 216 and 220, and current source 218, comprise the output stage of control circuit 200 and provide isolation and voltage level shifting between the reference and output stage 219. The voltage at the emitter of transistor 216 establishes a control point which drives output stage 219 of regulator circuit 100.

The voltage at the emitter of transistor 216 varies as follows. An increase in voltage at output terminal 104 above the reference voltage causes a decrease in the voltage at the emitter of transistor 216, which in turn causes output stage 219 of regulator circuit 100 to reduce the current conducted by output terminal 104, thereby lowering the output voltage of the regulator.

Conversely, a decrease in voltage at output terminal 104 below the reference voltage causes an increase in the voltage at the emitter of transistor 216, which in turn causes the output stage of regulator circuit 100 to increase the current conducted by output terminal 104, thereby raising the output voltage of the regulator.

Transistors 222, 224, 226 and 228 form output stage 219 of regulator circuit 100. Control circuit 200 drives the base of transistor 222 as described above. The emitter of transistor 222 is biased by current source 230, which preferably conducts a 200 microampere current. Transistor 222, which acts as a voltage follower, controls the voltage at the base of transistor 224 in response to the voltage output of control circuit 200. Transistor 226 is driven by transistor 224, and in turn provides drive current to transistor 228. Resistor 232, which preferably has a value of 1k ohm, acts as a pull-up resistor to turn off transistor 226 when transistor 224 turns off. Resistors 234 and 236, and diode 238, provide a small amount of negative feedback from the base of transistor 228 to transistor 224 to stabilize output stage 219. Preferably, resistors 234 and 236 have values of 50 ohms and 10 ohms, respectively.

Pass transistor 22B is a conventional integrated circuit power transistor. The collector-emitter circuit of transistor 22 is between input terminal 102 and output terminal 104. The voltage dropped across the collector-emitter circuit as the transistor conducts current between input terminal 102 and output terminal 104 controls the output voltage of regulator circuit 100. When the output voltage rises above the desired regulated value, control circuit 200 causes the voltage at the emitter of transistor 216 to decrease, which in turn decreases the current conducted by transistors 222, 224, 226 and 228 of the output stage. When the output voltage falls below the desired regulation value, control circuit 200 causes the voltage at the emitter of transistor 216 to increase, which in turn increases the current conducted by transistors 222, 224, 226 and 228 of the output stage. Transistors 224 and 226 provide current gain and voltage level shifting between transistors 222 and 228, and permit regulator circuit 100 to function with a low voltage differential (dropout voltage) between the input and output terminals. This dropout voltage may be lower than 1 volt, and is limited only by the total of the base-emitter voltage of transistor 228 and the collector-emitter saturation voltage of transistor 226. As described in greater detail below, the current limiting circuitry of the present invention operates solely off the input/output voltage differential, and without increasing the minimum dropout voltage of regulator circuit 100.

The collector of transistor 228 comprises multiple sections connected in parallel. The current conducted by a section of transistor 228 is sensed by resistor 240, which preferably has a low resistance value. Resistor 240 preferably is formed from the collector metal of one of the collector sections of transistor 228. In the preferred embodiment the resistance of resistor 240 is approximately 0.14 ohms, although of course other values may be used. A voltage is developed across resistor 240 which is substantially proportional to the output current of regulator circuit 100. As long as the voltage developed across resistor 240 is less than the input/output voltage differential minus the collector-emitter saturation voltage of transistor 228, it will not increase the dropout voltage of the regulator.

Transistors 242, 244, 246, 248, 250, 252 and 254 comprise the current limit circuit of regulator circuit 100. Diode-connected transistor 244 is connected to current source 256, which preferably conducts a 100 microamp current. Transistor 244 provides a referenced biasing point at node 270 for transistors 246 and 248 by setting the base voltage of transistors 246 and 248 at one diode drop below the voltage at input terminal 102. Transistors 246 and 248 are conventional lateral PNP transistors. Consequently, capacitance exists between the bases of transistors 246 and 248 and the substrate on which regulator circuit 100 is formed. Diode-connected transistor 244 provides a low A.C. impedance of approximately 260 ohms at the bases (node 270) of transistors 246 and 248. The low A.C. impedance of transistor 244 prevents the substrate capacitance from causing significant changes in the base voltages of transistors 246 and 248 when high frequency changes occur in the voltage of the substrate. Such high frequency changes in the substrate voltage occur, for example, during current limiting. This is because the limiting of output current causes a drop in the voltage at output terminal 104, to which the substrate is connected. These high frequency changes in substrate voltage, if permitted to substantially vary the base voltage of transistors 246 and 248, could cause the current limit circuit to oscillate. Therefore, transistors 246 and 248 are provided with a low A.C. impedance base drive to insulate them from the effects of high frequency output voltage variations. In addition, the low D.C. impedance of the diode (transistor 244), which is substantially equal to its A.C. impedance, prevents the base drive to transistors 246 and 248 from varying significantly with changes in the input/output voltage differential.

When the regulator output current is zero, transistors 246 and 248 each conduct current determined respectively by resistors 258 and 260. Transistors 246 and 248 will each conduct a current necessary to cause the difference between the base emitter junction voltage of the transistor and the base-emitter junction voltage of transistor 244 to equal the voltage dropped across the resistance between the emitter of the transistor (246 or 248) and input terminal 102. Resistors 258 and 260 preferably are equal. Thus, the currents conducted respectively by transistors 246 and 248 are substantially equal when the regulator output current is zero. The effect of resistor 240, which is preferably several orders of magnitude less than resistors 258 and 260, on the currents conducted by transistors 246 and 248 is negligible when the regulator output current is zero. To achieve a desired current in transistors 246 and 248, the difference in base emitter junction voltages necessary to establish the desired current is determined, and an emitter resistor value is chosen which will drop the calculated voltage when conducting the desired current. For example, it is preferable that transistor 244 conducts a 100 microamp current, and that transistors 246 and 248 each conduct a 15 microamp current when the regulator output current is zero, although other current ratios may be used. The difference ($\Delta V_{BE}$) in base emitter voltages between transistor 244 and each of transistors 246 and 248 is calculated as follows:

$$\Delta V_{BE}=(KT/q)\ln(I_{E1}/I_{E2}),$$

where K is Boltzmann's constant, q is the electric charge, T is the absolute temperature, $I_{E1}$ is the emitter current of transistor 246 or 248, and $I_{E2}$ is the emitter current of transistor 244. The value of resistors 258 and 260 is then calculated as follows:

$$R=\Delta V_{BE}/(15\times10^{-6}\text{ amps}),$$

which results in a resistance of approximately 3K ohms.

The currents conducted by transistors 246 and 248 are provided to transistor 250 and diode-connected transistor 252. Transistor 250 has multiple emitters tied together to provide an emitter area m times that of transistor 252, so that transistors 250 and 252 operate at different current densities. A typical value for m is 10, although other values of m can be used. The emitter-area ratio is chosen to cause transistor 250 to saturate when the regulator output current is zero. The collector-emitter saturation voltage of transistor 250 is such that it is insufficient to forward bias the base-emitter junction of transistor 242. Thus, transistor 242 is off.

As the regulator output current increases, a voltage is developed across resistor 240 in proportion to the current. The added voltage drop between input terminal 102 and resistor 260 causes the current conducted by transistor 248 to decrease. The current conducted by transistor 246, however, remains substantially constant. When the current conducted by transistor 248 decreases to a value such that the ratio of the currents conducted by transistors 246 and 248 is equal to the emitter area ratio of transistors 250 and 252, transistor 250 will come out of saturation. Thus, in the preferred embodiment described above, transistor 250 will come out of saturation when the current conducted by transistor 252 drops to one-tenth of the current conducted by transistor 250 (15 microamps/10=1.5 microamps). At this point the collector-emitter voltages of transistor pair 246, 248 are substantially equal, differing only by the voltage across resistor 240, which is approximately 100 millivolts. The collector-emitter voltages of transistor pair 250, 252 are also substantially equal, differing only by the voltage across resistors 264 and 274, which is normally less than 60 millivolts. As transistor 250 comes out of saturation, its collector-emitter voltage increases. This causes the voltage across the base-emitter junction of transistor 242 to become sufficient to forward bias the junction, and transistor 242 shunts drive current away from the base of transistor 224. The current limit circuit limits the current conducted by transistor 228 to maintain the balance in the collector-emitter voltages of the transistor pairs 246 and 248, and 250 and 252. Capacitor 262, connected between the collector and base of transistor 242, and resistor 264, connected between the emitter of transistor 242 and output terminal 104, stabilize the current limit loop. Capacitor 262 rolls off the high frequency gain of transistor 242 to ensure loop stability.

The current limit threshold established by transistors 246, 248, 250 and 252 is substantially independent of the input/output voltage differential across regulator circuit 100, except to the extent that controlled changes in the current limit threshold value are introduced by the foldback network described below. This result is achieved in part because the collector-emitter voltages of transistor pairs 246, 248 and 250, 252 are matched during current limit. Such matching causes the operating characteristics of the transistors in each pair to vary equally with changes in the input/output voltage differential. In turn, the current ratio value at which current limit occurs remains substantially constant.

Resistor 264 provides a small amount of positive feedback in the current limit loop at the beginning of current limit. The current conducted by the emitter of transistor 242 during current limit causes a voltage to be developed across resistor 264. This voltage increases the current limit loop gain during transition. A value of 10 ohms for resistor 264 has been empirically determined to be preferable, although, of course, other values of resistance may be used.

In this manner, the output current of regulator circuit 100 is limited without increasing the low dropout voltage of the circuit. For example, given the preferred values for resistors 258 and 260 and emitter ratio m described above, a maximum voltage of approximately 100 millivolts will be developed across resistor 240 at the onset of current limit. For all conditions, the input/output voltage differential minus the saturation voltage of transistor 228 is greater than the voltage across resistor 240 during current limiting, such that the dropout voltage is not increased by the current limit circuit.

Transistor 254, zener diode 266 and resistors 268, 270, 272, 274 and 264 form a foldback network which causes the current limit loop to limit the output current of the regulator at lower current values when the voltage differential between input and output terminals 102 and 104 increases above a threshold value. At input/output voltage differentials below the breakdown voltage of zener diode 266, no current is conducted by resistors 268, 270 and 272. Resistors 264 and 274 conduct only the current conducted by the emitter of transistor 250. Preferably, resistors 274 and 264 have low resistance values of approximately 90 ohms and 10 ohms, respectively, such that the voltage across the resistors is negligible at low input/output voltage differentials.

At input/output voltage differentials exceeding the breakdown voltage of zener diode 266, current is conducted by resistors 268, 270 and 272 and is fed through resistors 274 and 264, thereby raising the voltage across resistors 274 and 264. By adding a voltage in series with the emitter of transistor 250, the current ratio needed to cause the circuit to current limit is reduced. As a consequence, current limit occurs at a lower regulator output current. The foldback network thus has a threshold value determined by the breakdown voltage of zener diode 266. The rate at which the current limit value decreases as the input/output voltage differential increases above the threshold value is set by the values of resistors 268, 270 and 272.

As the input/output voltage differential increases above the breakdown voltage of zener diode 266, the voltage across resistor 270 continues to increase until the base-emitter junction of transistor 254 becomes forward biased, and transistor 254 begins to conduct. At this point, the current fed to resistors 274 and 264 is effectively established by resistor 272 such that the current limit value is caused to decrease at a greater rate with increases in the input/output voltage differential. This breakpoint in the current limit is temperature sensitive. The voltage needed to forward bias the base-emitter junction of transistor 254 decreases at a rate of approximately 2 millivolts per degree centigrade. Thus, at high temperatures, where uncompensated temperature coefficients of various components in regulator circuit 100 cause the current limit value for a given input/output voltage differential to increase, the breakpoint in the current limit is made to occur at a lower input/output voltage differential to ensure that the transistor operates in its safe operating area.

Preferably, values for resistors 268, 270 and 272, and the breakdown voltage of zener diode 266, are chosen to define a safe operating range limit on the current-voltage characteristics for transistor 228. For example, for a given transistor design, it may be desirable to prevent transistor 228 from conducting when the input/output voltage differential exceeds 20 volts. This limit on the input/output voltage differential is established to prevent transistor 228 from suffering damage as a result of thermal runaway. For this purpose, values of 16 K ohms, 1.8 K ohms and 10 K ohms for resistors 268, 270 and 272, respectively, and a breakdown voltage of 7 volts for zener diode 266, are preferable. Again, other values may be used if desired.

FIG. 3 illustrates how the current limit circuit of the present invention affects the operation of regulator circuit 100 at three operating temperatures. Curves 300, 302 and 304 respectively represent the output of regulator circuit 100 at temperatures of −55° C., 25° C. and 150° C. when output terminal 104 is short-circuited to ground. Breakpoints 306, 308 and 310 in the curves occur when the input/output voltage differential is approximately 7 volts, and are the result of current being conducted by resistors 268, 270 and 272 in the foldback network of the current limit circuit. As shown in FIG. 3, the foldback network causes current limit to occur at lower values of short circuit current as the input/output voltage differential increases above 7 volts. At higher input/output voltage differentials, a second breakpoint (312, 314 and 316) is introduced respectively into curves 300, 302 and 304. The second breakpoint increases the negative slope of each curve.

This second breakpoint is caused by the turning on of transistor 254 in the foldback network. As can be seen from FIG. 3, the second breakpoint occurs at different input/output voltage differentials, depending on the operating temperature. At the low temperature represented by curve 300, the breakpoint occurs when the input/output voltage differential is slightly above 15 volts. At higher temperatures, the breakpoint occurs at lower voltages, causing curves 302 and 304 to converge with curve 300 as the differential voltage approaches 20 volts. At 20 volts, the current limit circuit reduces the short circuit current substantially to zero. The breakpoints in the current limit curves are positioned to ensure that transistor 228 operates within its safe operating area, and may be varied.

Thus, a novel circuit for limiting the current conducted by a transistor has been described. Although a preferred embodiment of the invention has been disclosed with various components connected to other components, persons skilled in the art will appreciate that additional components may be interconnected between the shown connected components without departing from the spirit of the invention as shown. Further, component and other values and parameters may be modified. Persons skilled in the art will appreciate also that the present invention can be practiced by other than the described embodiment, and in particular, may be incorporated in circuits other than the described low dropout voltage regulator circuit, and may be modified for use with MOS transistors. The described embodiment is presented for purposes of illustration and not of limitation, and the present invention is limited only by the claims which follow.

What is claimed is:

1. In a circuit including a transistor for conducting current between a voltage supply connected to an input and a load connected to an output, the transistor having a control electrode adapted to receive a control signal responsive to a current limit signal for controlling the current conducted by the transistor, a circuit for generating the current limit signal comprising:

means for sensing current conducted by the transistor;

means responsive to said current sensing means for developing in a first pair of transistors a current ratio which varies as a function of the magnitude of the sensed current;

means connected to said voltage supply for driving and first pair of transistors, said drive means having a low A.C. impedance; and means including a second pair of transistors connected as active loads for said first pair of transistors responsive to said current ratio developing means for generating the current limit signal when the current ratio reaches a threshold value.

2. The current limit circuit of claim 1, wherein said drive means has a low D.C. impedance.

3. The current limit circuit of claim 1, wherein said current sensing means comprises a resistance between the voltage supply and the transistor.

4. The current limit circuit of claim 3, wherein said resistance comprises metal connected to an electrode of the transistor.

5. The current limit circuit of claim 4, wherein said resistance is connected to a collector of a bipolar transistor.

6. The current limit circuit of claim 1, wherein said drive means comprises a diode.

7. The current limit circuit of claim 6, wherein said diode comprises a diode-connected terminals.

8. The current limit circuit of claim 1, wherein the bases of said first pair of transistors are commonly driven from a common drive node, and wherein said means for driving said first pair of transistors is connected to said common drive node.

9. The current limit circuit of claim 1, wherein:

a first transistor of said second pair of transistors is adapted for operating at a lower current density than a second transistor of said second pair of transistors when the current ratio is below the threshold value;

said second transistor of said second pair of transistors is connected as a diode; and the base-emitter circuits of said second pair of transistors are serially in a loop having a node coupled to the output.

10. The current limit circuit of claim 9, further comprising means connected to said first transistor of said second pair of transistors for maintaining the collector-emitter voltages of said first transistor pair substantially equal, and the collector-emitter voltages of said second transistor pair substantially equal, when the current ratio reaches the threshold value.

11. The current limit circuit of claim 10, wherein said means for maintaining the collector-emitter voltages of said first pair of transistors substantially equal and the collector-emitter voltages of said second pair of transistors substantially equal comprises:

a third transistor having an emitter-base circuit serially in a loop with the collector-emitter of said first transistor of said second pair of transistors.

12. The current limit circuit of claim 10, wherein said means for maintaining the collector-emitter voltages of said first pair of transistors substantially equal and the collector-emitter voltages of said second pair of transistors substantially equal includes a third transistor having an emitter terminal biased with respect to the output, and a base terminal coupled to the collector of said first transistor of said second pair of transistors.

13. The current limit circuit of claim 12, wherein the base terminal of said third transistor is connected to the collector of said first transistor of said second pair of transistors.

14. The current limit circuit of claim 11, wherein said third transistor has its base connected to the collector of said first transistor of said second pair of transistors.

15. In a circuit including a transistor for conducting current between a voltage supply connected to an input and a load connected to an output, the transistor having a control electrode adapted to receive a control signal responsive to a current limit signal for controlling the current conducted by the transistor, a circuit for generating said current limit signal comprising:

means for sensing current conducted by the transistor;

a first pair of transistors;

means responsive to said current sensing means for developing in said first pair of transistors a current ratio which varies as a function of the magnitude of the sensed current;

means including a second pair of transistors respectively connected as active loads for each of said first pair of transistors for generating a current limit signal at an electrode of one of said second pair of transistors when the current ratio reaches a threshold value; and means for maintaining the collector-emitter voltages of said first transistor pair substantially equal and the collector-emitter voltages of said second transistor pair substantially equal when the current ratio reaches the threshold value, whereby the current ratio threshold value is maintained substantially constant over a range of input/output voltage differentials.

16. The current limit circuit of claim 15, wherein the bases of said first pair of transistors are commonly driven from a common drive node.

17. The current limit circuit of claim 15, wherein:

a first transistor of said second pair of transistors is adapted for operating at a lower current density than a second transistor of said second pair of transistors when the current ratio is below the threshold value;

said second transistor of said second pair of transistors is connected a s diode; and the emitters of said second pair of transistors are coupled to the output.

18. The current limit circuit of claim 17, wherein said means for maintaining the collector-emitter voltages of said first transistor pair substantially equal and the collector-emitter voltages of said second transistor pair substantially equal comprises:

a third transistor having an emitter-base circuit serially in a loop with the collector-emitter circuit of said first transistor of said second pair of transistors.

19. The current limit circuit of claim 18, wherein said third transistor has its base connected to the collector of said first transistor of said second pair of transistors.

20. The current limit circuit of claim 18, wherein said loop includes a node adapted for receiving a foldback current limit signal.

21. The current limit circuit of claim 17, wherein said means for maintaining the collector emitter voltages of said first pair of transistors substantially equal and the collector-emitter voltages of said second pair of transistors substantially equal includes a third transistor having an emitter terminal biased with respect to the output, and having a base terminal coupled to the collector of said first transistor of said second pair of transistors.

22. The current limit circuit of claim 21, wherein the base terminal of said third transistor is connected to the collector of said first transistor of said second pair of transistors.

23. In a circuit including a pass transistor for conducting current between a voltage supply connected to an input and a load connected to an output, the pass transistor having a control electrode adapted to receive a control signal for controlling the current conducted by the pass transistor, a current limit circuit for preventing the current conducted by the pass transistor from exceeding a current limit value, comprising:

means for sensing current conducted by the pass transistor;

means responsive to said current sensing means for developing in a first pair of transistors a current ratio which varies as a function of the magnitude of the sensed current;

a second pair of transistors connected as active loads for said first pair of transistors, wherein a first transistor of said second pair of transistors operates in saturation when the current conducted by the pass transistor is less than the current limit value; and means connected to said first transistor of the second pair of transistors and responsive to said current ratio developing means for generating the control signal and applying the control signal to the control electrode of the pass transistor when the current ratio reaches a threshold value.

24. The current limit circuit of claim 23, wherein the current ratio threshold value is responsive to the emitter area ratio of the second pair of transistors.

25. The current limit circuit of claim 24, further comprising a positive feedback loop for decreasing the current ratio threshold value when said current limit control signal is generated.

26. The current limit circuit of claim 25, further comprising means for reducing the current ratio threshold value at a first predetermined rate as the voltage across the collector-emitter circuit of the transistor increases above a first threshold level, said reducing means further including means for changing the rate of reduction of the current ratio threshold value from the first predetermined rate when said collector-emitter voltage increases above a second threshold level.

27. The current limit circuit of claim 25, wherein said second threshold level decreased with increasing temperature.

28. The current limit circuit of claim 23, wherein the bases of said first pair of transistors are commonly driven from a common drive node.

29. The current limit circuit of claim 24, wherein the emitter area of said first transistor of said second pair of transistors is greater than the emitter area of said second transistor of said second pair of transistors.

30. The current limit circuit of claim 23, wherein:

a second transistor of said second pair of transistors is connected as a diode and the base-emitter circuits of said second pair of transistors are serially in a loop having a node coupled to the output; and said control signal generating means includes a transistor having an emitter-base circuit serially in a loop with the collector-emitter circuit of said first transistor of said second pair of transistors, such that the collector-emitter voltages of said first pair of transistors are maintained substantially equal, and the collector-emitter voltages of said second pair of transistors are maintained substantially equal, when the current ratio reaches the threshold value.

31. The current limit circuit of claim 30, wherein the control signal is generated at a collector of said transistor.

32. The current limit circuit of claim 25, wherein said positive feedback loop comprises:

a transistor having a base-emitter circuit and at least one collector;

a resistance connected between the emitter of said first transistor of said second pair of transistors and said output, said resistance defining a first node having a voltage greater than the voltage at the output; and wherein the base-emitter circuit of said transistor is connected between the collector of said first transistor of said second pair of transistors and said first node.

33. The current limit circuit of claim 32, wherein said resistance defines a second node having a voltage greater than that of said first node, further comprising:

means connected between said input and said second node for reducing the current ratio threshold value at a first predetermined rate as the voltage across the collector-emitter circuit of the transistor increases above a first threshold level, said reducing means further including means for changing the rate of reduction of the current ratio threshold value from the first predetermined rate when said collector-emitter voltage increases above a second threshold level.

34. The current limit circuit of claim 33, wherein said second threshold level decreased with increasing temperature.

35. In a circuit including a transistor for conducting current between a first terminal adapted to be connected to a voltage supply and a second terminal adapted to be connected to a load, the circuit including circuitry connected to the base of the transistor for providing drive current to the transistor, a circuit for preventing the current conducted by the transistor from exceeding a current limit value comprising:

a sense resistor between said first terminal and a collector of said transistor;

first and second transistors having base-emitter circuits connected serially in a loop with said sense resistor, such that the collector-emitter circuit of said first transistor conducts a substantially constant current and the collector-emitter circuit of said second transistor conducts a current which varies as a function of the magnitude of the current conducted by said sense resistor;

a third transistor having a collector-emitter circuit connected in series with the collector-emitter circuit of said first transistor, and having an emitter area;

a fourth transistor connected as a diode and having a collector-emitter circuit connected n series with the collector-emitter circuit of said second transistor, and having an emitter area that is n times less than the emitter area of said third transistor, wherein:

said third and fourth transistors have base-emitter circuits serially in a loop, said loop including a node coupled to said second terminal, such that a signal is generated at the collector of said third transistor to limit the current conducted by the transistor to the current limit value when the current conducted by said first transistor is n times greater than the current conducted by said second transistor.

36. The circuit of claim 35, wherein said first and second transistors are commonly driven by a low A.C. impedance means connected to said common base drive node and said first terminal.

37. The circuit of claim 36, wherein said low A.C. impedance means comprises a diode-connected transistor.

38. The circuit of claim 35, further comprising a fifth transistor, having a base-emitter circuit connected serially in a loop with the collector-emitter circuit of said third transistor and having a collector connected for decreasing, in response to said signal, base drive current provided to the transistor.

39. The circuit of claim 38, wherein said loop includes a node located between the emitters of said third and fifth transistors, and wherein said circuit further comprises a first resistor between said node and said second terminal.

40. The circuit of claim 39, further comprising:

a second resistor between the emitter of said third transistor and said node; and a foldback circuit connected serially in a loop with said first, second and sense resistors, and the collector-emitter circuit of the transistor, said foldback circuit including a third resistor in series with a zener diode and the collector-emitter circuit of a sixth transistor, said sixth transistor having a collector-base circuit connected serially in a loop with a fourth resistor, and a base-emitter circuit connected serially in a loop with a fifth resistor.

41. The current limit circuit of claim 35, wherein the bases of said first and second transistors are commonly driven from a common drive node.

42. In a circuit including a pass transistor for conducting current between an input terminal adapted to be connected to a voltage supply and an output terminal adapted to be connected to a load, the pass transistor conducting current in response to a base drive signal, a circuit operable at low input/output voltage differentials for limiting the current conducted by the pass transistor, comprising:

means for sensing current conducted by the pass transistor;

first and second transistors, each of said first and second transistors conducting a current and connected such that the current conducted by at least one of said first and second transistors varies as a function of the magnitude of the sensed current;

third and fourth transistors respectively connected as active loads for said first and second transistors for conducting the currents conducted by said first and second transistors to the output terminal, said third and fourth transistors each operating at a current density to produce a current density ratio, whereby a current limit signal is generated at a collector of said third transistor when the current density ratio reaches a threshold value; and a fifth transistor having an emitter biased with respect to the output terminal and a base coupled to the collector of the third transistor, and having a collector connected for causing the base drive signal provided to the pass transistor to be decreased in response to a current limit signal.

43. The current limit circuit of claim 42, wherein said fourth transistor is connected as a diode and the bases of said third and fourth transistors are commonly driven.

44. The current limit circuit of claim 43, wherein said current sensing means develops a voltage responsive to current conducted by the pass transistor, and wherein said current conducted by said second transistor decreases when the voltage developed by said current sensing means increases.

45. The current limit circuit of claim 42, wherein:

said current sensing means comprises a first resistance connected between a collector of the pass transistor and said input terminal, such that a node is defined between said first resistance and said collector; and said current ratio developing means comprises:

a second resistance connected between said node and an emitter of said second transistor; and a third resistance connected between said input terminal and an emitter of said first transistor.

46. The current limit circuit of claim 42, wherein said first and second transistors are driven by a drive transistor having a base-emitter circuit between said input terminal and the bases of said first and second transistors, such that the base-emitter voltage of said drive transistor is developed across at least the base-emitter circuits of said first and second transistors.

47. The current limit circuit of claim 45, wherein said first and second transistors are driven by a drive transistor having a base-emitter circuit between said input terminal and the bases of said first and second transistors, such that the base-emitter voltage of said drive transistor is developed at least across said first and second resistances and the base-emitter circuit of said second transistor, and at least across said third resistance and the base-emitter circuit of said first transistor.

48. In a circuit including a pass transistor having a collector-emitter circuit connected for conducting current between a voltage supply connected to an input and a load connected to an output, the pass transistor being responsive to a current limit signal generated in the circuit for limiting current conducted by the pass transistor to a current limit value, the circuit having a node for receiving a foldback signal, said foldback signal being responsive to the magnitude of the collector-emitter voltage of the pass transistor, a circuit for generating the foldback signal comprising:

a resistance connected between the node and the output;

a zener diode;

a transistor;

a first resistor connected serially in a loop with a base-emitter circuit of said transistor;

a second resistor connected serially in a loop with a collector-base circuit of said transistor, wherein:

said zener diode and the collector-emitter circuit of said transistor are in series between the input and the node, such that the current limit value decreased at a first rate when a first threshold input/output voltage differential is reached, and at a second rate when a second threshold input/output voltage differential is reached, and said second threshold input/output voltage differential decreases with increasing temperature.

49. The foldback circuit of claim 48, further including a third resistor in series with said zener diode and the collector-emitter circuit of said transistor between the input and the node.

* * * * *

UNITED STATES PATENT AND TRADEMARK OFFICE
CERTIFICATE OF CORRECTION

PATENT NO. : 4,851,953

DATED : July 25, 1989

INVENTOR(S) : Dennis P. O'Neill and Carl T. Nelson

It is certified that error appears in the above-identified patent and that said Letters Patent is hereby corrected as shown below:

Column 1, line 26, delete "voltage regulator" (second occurrence);

Column 4, line 63, "22B" should be -- 228 --;

Column 4, line 65, "22" should be -- 228 --;

Claim 7, column 10, line 2, "terminals" should be -- transistor --;

Claim 11, column 10, line 32, after "collector-emitter" insert -- circuit --;

Claim 27, column 12, line 23, "25" should be -- 26 --;

Claim 27, column 12, line 24 "decreased" should be -- decreases --;

Claim 34, column 13, line 9 "decreased" should be -- decreases --;

UNITED STATES PATENT AND TRADEMARK OFFICE
CERTIFICATE OF CORRECTION

PATENT NO. : 4,851,953

DATED : July 25, 1989

INVENTOR(S) : Dennis P. O'Neill and Carl T. Nelson

It is certified that error appears in the above-identified patent and that said Letters Patent is hereby corrected as shown below:

Claim 35, column 13, line 34, "n" should be --in--;

Claim 48, column 16, line 12, "decreased" should be --decreases--.

Signed and Sealed this

Thirty-first Day of March, 1992

*Attest:*

HARRY F. MANBECK, JR.

*Attesting Officer*

*Commissioner of Patents and Trademarks*